(12) United States Patent
Wei et al.

(10) Patent No.: US 11,005,744 B2
(45) Date of Patent: May 11, 2021

(54) PORT RATE DETERMINING METHOD AND COMPUTER DEVICE

(71) Applicant: Huawei Technologies Co., Ltd., Guangdong (CN)

(72) Inventors: Xu Wei, Chengdu (CN); Yuanting Long, Chengdu (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 29 days.

(21) Appl. No.: 16/369,650

(22) Filed: Mar. 29, 2019

(65) Prior Publication Data
US 2019/0230018 A1    Jul. 25, 2019

Related U.S. Application Data

(63) Continuation of application No. PCT/CN2017/104022, filed on Sep. 28, 2017.

(30) Foreign Application Priority Data

Sep. 30, 2016   (CN) .......................... 201610876824.4

(51) Int. Cl.
```
H04L 12/26    (2006.01)
H04L 12/24    (2006.01)
H04L 12/40    (2006.01)
G06F 13/38    (2006.01)
G06F 13/42    (2006.01)
```
(52) U.S. Cl.
CPC ........ *H04L 43/0894* (2013.01); *G06F 13/385* (2013.01); *G06F 13/4265* (2013.01); *H04L 12/40136* (2013.01); *H04L 41/0896* (2013.01); *H04L 43/0882* (2013.01)

(58) Field of Classification Search
None
See application file for complete search history.

(56) References Cited

U.S. PATENT DOCUMENTS

| | | | |
|---|---|---|---|
| 2002/0122421 A1 | 9/2002 | Ambiehl et al. | |
| 2005/0138202 A1 | 6/2005 | Seto | |
| 2005/0210159 A1* | 9/2005 | Voorhees | G06F 13/387 710/5 |

(Continued)

FOREIGN PATENT DOCUMENTS

| CN | 1414737 A | 4/2003 |
|---|---|---|
| CN | 1989740 A | 6/2007 |

(Continued)

*Primary Examiner* — Nicholas Sloms
(74) *Attorney, Agent, or Firm* — Womble Bond Dickinson (US) LLP

(57) ABSTRACT

A method and apparatus for determining a port rate determines a channel transmission rate of an SAS port including N physical channels. The method includes: determining M different negotiated rates of the N physical channels; separately determining M total port bandwidths corresponding to the M different negotiated rates; and determining a negotiated rate corresponding to a largest total port bandwidth in the M total port bandwidths as a channel transmission rate of the port. A lowest negotiated rate is no longer used as the channel transmission rate of the port, but the negotiated rate corresponding to the largest total port bandwidth is determined as the channel transmission rate of the port.

8 Claims, 2 Drawing Sheets

(56) References Cited

U.S. PATENT DOCUMENTS

| | | |
|---|---|---|
| 2006/0034334 A1 | 2/2006 | Biederman |
| 2007/0093124 A1* | 4/2007 | Varney ................. G06F 11/3409 439/499 |
| 2007/0206509 A1 | 9/2007 | Vedanabhatla et al. |
| 2008/0240092 A1 | 10/2008 | Moratt et al. |
| 2012/0221742 A1 | 8/2012 | Hsu |
| 2012/0233399 A1* | 9/2012 | Kurokawa .......... H04L 12/4625 711/114 |
| 2013/0195154 A1 | 8/2013 | Mobin et al. |
| 2014/0129723 A1* | 5/2014 | Kaufmann ............ G06F 13/385 709/227 |
| 2014/0169210 A1* | 6/2014 | Henry ................. G06F 13/4022 370/253 |
| 2014/0341231 A1* | 11/2014 | Henry .................... H04J 3/047 370/442 |
| 2015/0324268 A1 | 11/2015 | Du |

FOREIGN PATENT DOCUMENTS

| | | |
|---|---|---|
| CN | 10121746 A | 7/2008 |
| CN | 101442781 A | 5/2009 |
| CN | 101510847 A | 8/2009 |
| CN | 102651709 A | 8/2012 |
| CN | 103139088 A | 6/2013 |

\* cited by examiner

PORT RATE DETERMINING METHOD AND COMPUTER DEVICE

CROSS-REFERENCE TO RELATED APPLICATIONS

This application is a continuation of International Application No. PCT/CN2017/104022, filed on Sep. 28, 2017, which claims priority to Chinese Patent Application No. 201610876824.4, filed on Sep. 30, 2016. The disclosures of the aforementioned applications are hereby incorporated by reference in their entireties.

TECHNICAL FIELD

This application relates to the computer field, and in particular, to a port rate determining method and a computer device.

BACKGROUND

The serial attached small computer system interface (SAS) is an intelligent general-purpose interface standard, and is used for a communication connection between modules in a computer and a connection between the computer and another peripheral device (for example, a hard disk drive or a CD-ROM drive). In the SAS standard, a point-to-point connection is established between a data initiator and a data target, and an appropriate physical channel is selected for data transmission. Before a physical channel using the SAS standard is used, a rate of data transmission on each physical channel usually needs to be negotiated by using a rate negotiation method. A negotiated rate is used to represent a largest transmission rate of data transmission on each physical channel. To be specific, on the physical channel, data can be transmitted at a rate less than or equal to the negotiated rate, but data cannot be transmitted at a rate greater than the negotiated rate.

Based on the physical channel, a concept of a port is further defined in the SAS standard. Specifically, a plurality of physical channels may be integrated into one port. A device that uses the port can transmit data on any physical channel in the port. An SAS port is controlled by a computer device. If the initiator is to transmit data, the computer device sets a channel transmission rate of the data, then selects an available physical channel from the port at random, and transmits the data on the selected physical channel at the specified channel transmission rate. The plurality of physical channels are integrated into the port, so that an effective bandwidth between the data initiator and the data target can be improved, improving data transmission efficiency.

However, negotiated rates of different physical channels in a same port may be the same or different, and this makes it troublesome for the computer device to set a data transmission rate. For example, if the computer device sets a relatively high channel transmission rate, data transmission fails if a physical channel whose negotiated rate is less than the specified channel transmission rate is selected for the port during data transmission. To reduce a data transmission failure probability, in an existing technology, the computer device usually sets the channel transmission rate to a lowest negotiated rate in negotiated rates of all the physical channels. However, in this case, an obtained total port transmission bandwidth is smallest, and consequently data transmission efficiency is not ideal enough.

SUMMARY

The embodiments of this application provide a port rate determining method, to determine a channel transmission rate of an SAS port. This application further provides a related computer device.

A first aspect of this application provides a port rate determining method, including: for a port including N physical channels, determining, by a computer device, M negotiated rates of the N physical channels, where the negotiated rate is a communication rate negotiated for each physical channel when a connection is established between the port and a port of a peer end; separately determining, by the computer device, M total port bandwidths corresponding to the M different negotiated rates, where a total port bandwidth corresponding to an $i^{th}$ negotiated rate in the M negotiated rates is a total bandwidth reached by the port when the $i^{th}$ negotiated rate is set as a channel transmission rate of the port; and setting, by the computer device, a negotiated rate corresponding to a largest total port bandwidth in the M total port bandwidths as the channel transmission rate of the port. In this embodiment, a lowest negotiated rate is no longer used as the channel transmission rate of the port, but the negotiated rate corresponding to the largest total port bandwidth is determined as the channel transmission rate of the port. In this way, the largest total port bandwidth can be obtained, to improve data transmission efficiency.

Optionally, the total port bandwidth corresponding to the $i^{th}$ negotiated rate is a product of the $i^{th}$ negotiated rate and a quantity of physical channels whose negotiated rates are not less than the $i^{th}$ negotiated rate.

Optionally, after setting the channel transmission rate of the port, the computer device disables a physical channel whose negotiated rate is less than the channel transmission rate in the port. The disabled physical channel cannot be used any longer. In this case, during subsequent selection of a data transmission physical channel, the physical channel whose negotiated rate is less than the channel transmission rate is not selected, so that a data transmission failure probability can be greatly reduced.

Optionally, after setting the channel transmission rate of the port, the computer device decreases a negotiated rate of a physical channel that is greater than the specified channel transmission rate to the channel transmission rate. In this way, the negotiated rates of all the physical channels are the same. Therefore, a physical channel only needs to be selected from the port at random for data transmission, without a need of selecting a physical channel by the computer device, reducing a computation amount of the computer device, namely, a rate determining apparatus, and balancing use frequency of all the physical channels.

Optionally, if the largest total port bandwidth is corresponding to two or more negotiated rates, the computer device selects, from the two or more negotiated rates, a lowest negotiated rate as the channel transmission rate. In this way, more physical channels can be used instead of being disabled, and load of all the physical channels can be balanced.

A second aspect of this application provides a computer device, including a port used to perform data transmission with a peer end. The port includes N physical channels. The computer device further includes a negotiated rate determining module, configured to obtain a negotiated rate of each of the N physical channels, to obtain M different negotiated rates, where N is a positive integer greater than 1, and M is a positive integer not greater than N. The negotiated rate is used to represent a communication rate negotiated for each physical channel when a connection is established between the port and a port of the peer end. The computer device further includes a port bandwidth calculation module, configured to determine a total port bandwidth corresponding to each of the M negotiated rates. A total port bandwidth corresponding to an $i^{th}$ negotiated rate in the M negotiated rates is a total bandwidth that can be reached by the port when the $i^{th}$ negotiated rate is used as a channel transmission rate of the port. The channel transmission rate is used to represent an actual rate of data transmission on each physical channel in the port. The computer device further includes a channel rate control module, configured to set a negotiated rate corresponding to a largest total port bandwidth in total port bandwidths corresponding to the M negotiated rates as the channel transmission rate of the port. The computer device provided in this application no longer uses a lowest negotiated rate as the channel transmission rate of the port, but determines the negotiated rate corresponding to the largest total port bandwidth as the channel transmission rate of the port. In this way, the largest total port bandwidth can be obtained, to improve data transmission efficiency.

Optionally, the total port bandwidth corresponding to the $i^{th}$ negotiated rate is specifically a product of the $i^{th}$ negotiated rate and a quantity of physical channels whose negotiated rates are not less than the $i^{th}$ negotiated rate.

Optionally, the channel rate control module is further configured to disable a physical channel whose negotiated rate is less than the channel transmission rate in the port. The disabled physical channel cannot be used any longer. In this case, during subsequent selection of a data transmission physical channel, the physical channel whose negotiated rate is less than the channel transmission rate is not selected, so that a data transmission failure probability can be greatly reduced.

Optionally, the channel rate control module is further configured to decrease a negotiated rate of a physical channel in the port that is greater than the channel transmission rate, so that the negotiated rate of the physical channel decreases to the channel transmission rate. In this way, negotiated rates of available physical channels in the port are the same, so that utilization of transmission performance of all the physical channels can be balanced.

Optionally, if the largest total port bandwidth in the M total port bandwidths is corresponding to two or more negotiated rates, the channel rate control module may select, from the two or more negotiated rates, a lowest negotiated rate as the channel transmission rate. A low negotiated rate is selected as the channel transmission rate, so that more physical channels can be used instead of being disabled, and load of all the physical channels can be balanced.

A third aspect of this application provides a computer device, including a processor, a memory, and a communications interface. The processor is configured to invoke program code stored in the memory, to perform the port rate determining method according to the first aspect of this application.

DESCRIPTION OF EMBODIMENTS

Embodiments of this application provide a port rate determining method, to determine a channel transmission rate of an SAS port. Embodiments of this application further provide a related computer device. Descriptions are separately provided below.

The SAS port is usually integrated into an SAS interface card. The SAS interface card is controlled by program software that runs on the computer device. The SAS interface card may serve as a peripheral interface of the computer device or a device in which the computer device is disposed, and is connected to the computer device in a Peripheral Component Interconnect Express (PCIe) manner.

Figure 1:
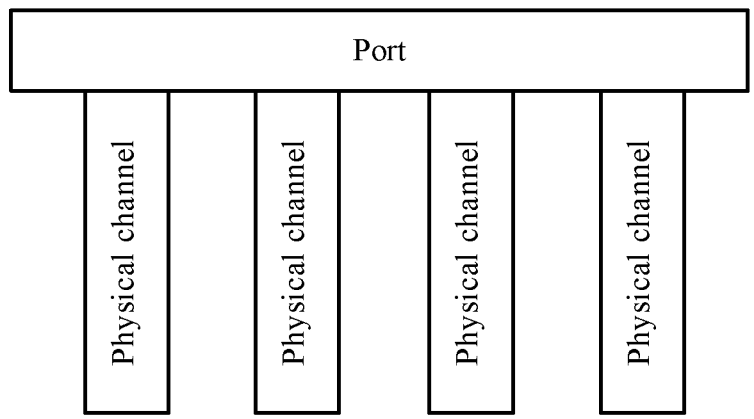
FIG. 1 is a schematic structural diagram of an SAS port.

FIG. 1 is a schematic diagram of a port defined in the SAS standard. It can be learned from FIG. 1 that one port may include a plurality of physical channels. After a connection is established between the port and a port of a peer end, an electrical signal of the port changes, to trigger the computer device to perform rate negotiation. A communication rate negotiated for each physical channel is a negotiated rate of the physical channel. Negotiated rates of all the physical channels may be the same or different. Common negotiated rates of the physical channel include 12 G bits per second (bps), 6 Gbps, 3 Gbps, and the like. A port including four physical channels whose negotiated rates are successively 12 Gbps, 6 Gbps, 6 Gbps, and 3 Gbps from left to right is merely used as an example in FIG. 1 for description. If an initiator is to send data on the SAS port, the computer device usually first determines a channel transmission rate of the port, and then transmits the data on any physical channel in the port at the determined channel transmission rate.

Figure 2:
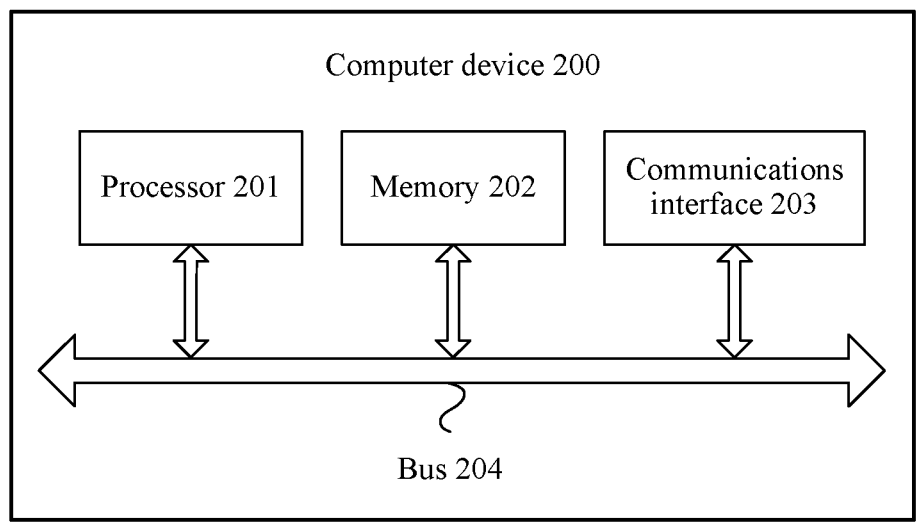
FIG. 2 is a structural diagram of an embodiment of a computer device according to this application.

The computer device provided in an embodiment of this application may be implemented by a computer device 200 shown in FIG. 2. The computer device 200 includes a processor 201, a memory 202, and a communications interface 203. Optionally, the computer device 200 further includes a bus 204. The processor 201, the memory 202, and the communications interface 203 may implement a communication connection to each other by using the bus 204, or certainly, may communicate with each other by another means, for example, through wireless transmission.

The memory 202 may include a volatile memory, for example, a random access memory (RAM); or the memory 202 may include a non-volatile memory, for example, a read-only memory (ROM), a flash memory, a hard disk drive (HDD), or a solid state disk (SSD); or the memory 202 may include a combination of the foregoing types of memories. When the technical solutions provided in the embodiments of this application are implemented by using software, program code used to implement the port rate determining method provided in embodiments of this application may be stored in the memory 202, and may be executed by the processor 201.

The communications interface 203 is configured to connect to an SAS interface card. A PCIe interface matching the SAS interface card is usually used as the communications interface 203, or another interface may be used. This is not limited in this application.

The processor 201 may be one or a combination of the following hardware units with a processing function: a CPU, digital signal processor (DSP), an application-specific integrated circuit (ASIC), a field programmable gate array (FPGA), a hardware chip, and the like. The processor 201 invokes the program code stored in the memory 202 and runs the program code in the memory 202, to perform a port rate determining method shown in FIG. 3.

Figure 3:
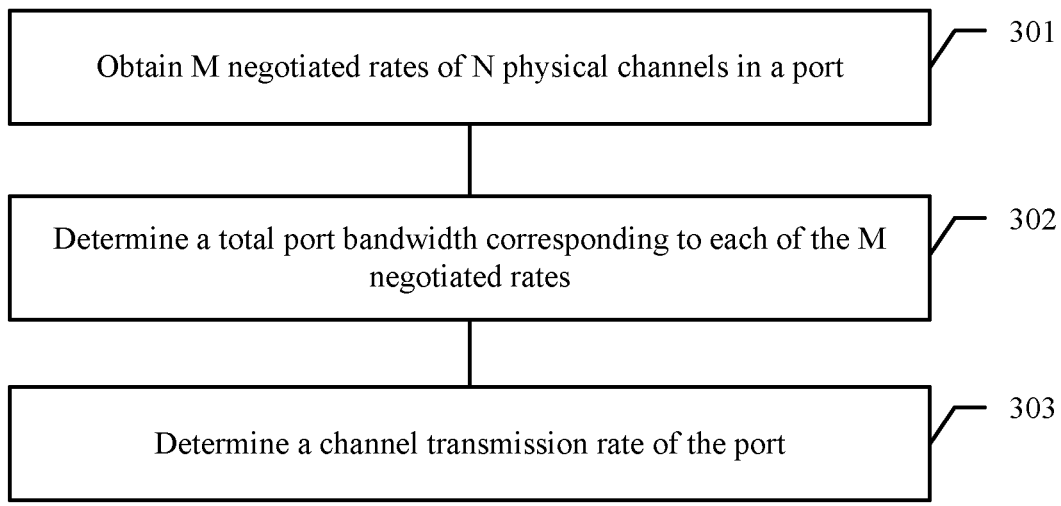
FIG. 3 is a flowchart of an embodiment of a port rate determining method according to this application.

The port rate determining method is shown in FIG. 3, and is applicable to a computer device. The computer device includes a port used to perform data transmission with a peer end, and the port rate determining method includes the following steps.

301. Obtain M negotiated rates of N physical channels in a port.

In this embodiment, the port including the N physical channels is used as an example for description, where N is a positive integer greater than 1. The computer device obtains a negotiated rate of each of the N physical channels. Specifically, the computer device may determine the negotiated rate of each physical channel through rate negotiation, or obtain the negotiated rate of each physical channel in another manner. This is not limited in this embodiment.

The negotiated rates of the N physical channels may be different from each other, or some of the negotiated rates of the physical channels may be the same. Therefore, the computer device determines the negotiated rates of the N physical channels, to obtain the M different negotiated rates in total, where M is a positive integer not greater than N. Specifically, if the negotiated rates of the N physical channels are different from each other, N=M. If some of the negotiated rates of the physical channels are the same, M<N.

The port shown in FIG. 1 is used as an example for description. Negotiated rates of four physical channels are successively 12 Gbps, 6 Gbps, 6 Gbps, and 3 Gbps, and therefore a total of three different negotiated rates are determined: successively 12 Gbps, 6 Gbps, and 3 Gbps.

302. Determine a total port bandwidth corresponding to each of the M negotiated rates.

After determining the M different negotiated rates, the computer device determines total port bandwidths corresponding to the M different negotiated rates. In this embodiment, a total port bandwidth corresponding to an $i^{th}$ negotiated rate in the M negotiated rates is a total bandwidth that can be reached by the port when the $i^{th}$ negotiated rate is used as a channel transmission rate of the port. The channel transmission rate of the port is a data transmission rate of any one of the N physical channels that is selected from the port, where i is a positive integer not greater than M.

It may be understood that, when the $i^{th}$ negotiated rate is used as the channel transmission rate of the port, data cannot be transmitted on a physical channel whose negotiated rate is less than the $i^{th}$ negotiated rate, and data can be normally transmitted on a physical channel whose negotiated rate is greater than or equal to the $i^{th}$ negotiated rate. Therefore, the total port bandwidth corresponding to the $i^{th}$ negotiated rate is a product of the $i^{th}$ negotiated rate and a quantity of physical channels whose negotiated rates are not less than the $i^{th}$ negotiated rate.

The port shown in FIG. 1 is used as an example for description. The negotiated rates of the four physical channels are successively 12 Gbps, 6 Gbps, 6 Gbps, and 3 Gbps, and the three different negotiated rates are determined in step 301: 12 Gbps, 6 Gbps, and 3 Gbps. If the first negotiated rate 12 Gbps is used as the channel transmission rate, a first physical channel can be used, and a second physical channel to a fourth physical channel cannot be used because negotiated rates of the second physical channel to the fourth physical channel are less than 12 Gbps and data cannot be transmitted in 12 Gbps. Therefore, a total port bandwidth corresponding to the negotiated rate 12 Gbps is 12 Gbps. If the second negotiated rate 6 Gbps is used as the channel transmission rate, a first physical channel to a third physical channel can be used, and a fourth physical channel cannot be used because a negotiated rate of the fourth physical channel is less than 6 Gbps. Therefore, a total port bandwidth corresponding to the negotiated rate 6 Gbps is 6 Gbps×3=18 Gbps. If the third negotiated rate 3 Gbps is used as the channel transmission rate, a first physical channel to a fourth physical channel can all be used. Therefore, a total port bandwidth corresponding to the negotiated rate 3 Gbps is 3 Gbps×4=12 Gbps.

The computer device determines the total port bandwidth corresponding to each of the M negotiated rates based on a method the same as the method for determining the total port bandwidth corresponding to the $i^{th}$ negotiated rate, to obtain the M total port bandwidths in total.

303. Determine a channel transmission rate of the port.

After determining the M total port bandwidths corresponding to all the M negotiated rates, the computer device determines a negotiated rate corresponding to a largest total port bandwidth in the M total port bandwidths as the channel transmission rate of the port.

The port shown in FIG. 1 is used as an example for description. The negotiated rates of the four physical channels are successively 12 Gbps, 6 Gbps, 6 Gbps, and 3 Gbps. There are three different negotiated rates: 12 Gbps, 6 Gbps, and 3 Gbps, and total port bandwidths corresponding to the three different negotiated rates are respectively 12 Gbps, 18 Gbps, and 12 Gbps. The second negotiated rate 6 Gbps is corresponding to the largest total port bandwidth 18 Gbps. Therefore, the negotiated rate 6 Gbps is determined as the channel transmission rate of the port.

After the computer device determines the channel transmission rate of the port, if new data is to be transmitted on the port, the computer device selects a physical channel from the port, and transmits the new data on the physical channel at the channel transmission rate.

This embodiment of this application provides the port rate determining method. For the port including the N physical channels, the computer device determines the M different negotiated rates of the N physical channels; separately determines the M total port bandwidths corresponding to the M different negotiated rates; and determines the negotiated rate corresponding to the largest total port bandwidth in the M total port bandwidths as the channel transmission rate of the port. In this embodiment, a lowest negotiated rate is no longer used as the channel transmission rate of the port, but the negotiated rate corresponding to the largest total port bandwidth is determined as the channel transmission rate of the port. In this way, the largest total port bandwidth can be obtained, to improve data transmission efficiency.

Optionally, after determining the channel transmission rate of the port, the computer device may disable a physical channel whose negotiated rate is less than the channel transmission rate in the port. The disabled physical channel cannot be used any longer. In this case, during subsequent selection of a data transmission physical channel, the physical channel whose negotiated rate is less than the channel transmission rate is not selected, so that a data transmission failure probability can be greatly reduced.

The channel transmission rate that is of the port and that is determined in step 303 may be less than negotiated rates of some available physical channels in the port. In some prior-art scenarios, the computer device further has a physical channel selection function. When negotiated rates of available physical channels in the port are different, the computer device preferentially selects a physical channel with a relatively low negotiated rate, to fully utilize performance of each physical channel. However, in this method, a physical channel is not selected at random, increasing a computation amount of the computer device; and in addition, a physical channel with a relatively low negotiated rate is preferentially used, and consequently use frequency of all the physical channels is imbalanced, and utilization of transmission performance of all the physical channels cannot be balanced. Therefore, optionally, in this embodiment of this application, after determining the channel transmission rate of the port, the computer device may decrease a negotiated rate of a physical channel in the port that is greater than the channel transmission rate, so that the negotiated rate of the physical channel decreases to the channel transmission rate. In this way, negotiated rates of available physical channels in the port are the same. Therefore, a physical channel only needs to be selected from the port at random for data transmission, without a need of selecting a physical channel by the computer device. In this way, a computation amount of the computer device is decreased. In addition, selecting a physical channel at random balances use frequency of all the physical channels and can balance utilization of transmission performance of all the physical channels.

Optionally, in step 303, if the largest total port bandwidth in the M total port bandwidths is corresponding to two or more negotiated rates, one of the two or more negotiated rates may be selected at random as the channel transmission rate of the port, or one of the two or more negotiated rates may be selected as the channel transmission rate of the port based on a specific rule. This is not limited in this application. For example, a lowest negotiated rate in the two or more negotiated rates may be selected as the channel transmission rate. A low negotiated rate is selected as the channel transmission rate, so that more physical channels can be used instead of being disabled, and load of all the physical channels can be balanced.

Optionally, each time the computer device or a device in which the computer device is disposed is restarted, or a cable of the computer device or a device in which the computer device is disposed is disconnected or connected, or another event that results in port renegotiation occurs, the computer device performs the port rate determining method shown in FIG. 3 again to determine a channel transmission rate of the port again.

The foregoing embodiment describes the port rate determining method provided in this application, and a computer device that implements the foregoing method is described below. For a specific structure of the computer device, refer to FIG. 4. The computer device mainly includes a negotiated rate determining module 401, a port bandwidth calculation module 402, and a channel rate control module 403.

The negotiated rate determining module 401 is configured to determine a negotiated rate of each of N physical channels in an SAS port, where N is a positive integer greater than 1, and the negotiated rate is used to represent a communication rate negotiated for each physical channel when a connection is established between the port and a port of a peer end. Negotiated rates of the N physical channels include M different negotiated rates, where M is a positive integer not greater than N.

The port bandwidth calculation module 402 is configured to determine a total port bandwidth corresponding to each of the M negotiated rates. A total port bandwidth corresponding to an $i^{th}$ negotiated rate in the M negotiated rates is a total bandwidth that can be reached by the port when the $i^{th}$ negotiated rate is used as a channel transmission rate of the port. The channel transmission rate is used to represent an actual rate of data transmission on each physical channel in the port.

The channel rate control module 403 is configured to set a negotiated rate corresponding to a largest total port bandwidth in total port bandwidths corresponding to the M negotiated rates as the channel transmission rate of the port.

This embodiment of this application provides the computer device. For the port including the N physical channels, the negotiated rate determining module 401 determines the M different negotiated rates of the N physical channels. The port bandwidth calculation module 402 separately determines the M total port bandwidths corresponding to the M different negotiated rates. The channel rate control module 403 determines the negotiated rate corresponding to the largest total port bandwidth in the M total port bandwidths as the channel transmission rate of the port. The computer device provided in this embodiment no longer uses a lowest negotiated rate as the channel transmission rate of the port, but determines the negotiated rate corresponding to the largest total port bandwidth as the channel transmission rate of the port. In this way, the largest total port bandwidth can be obtained, to improve data transmission efficiency.

Optionally, the total port bandwidth corresponding to the $i^{th}$ negotiated rate is specifically a product of the $i^{th}$ negotiated rate and a quantity of physical channels whose negotiated rates are not less than the $i^{th}$ negotiated rate.

Optionally, the channel rate control module 403 is further configured to disable a physical channel whose negotiated rate is less than the channel transmission rate in the port. The disabled physical channel cannot be used any longer. In this case, during subsequent selection of a data transmission physical channel, a physical channel whose negotiated rate is less than the channel transmission rate is not selected, so that a data transmission failure probability can be greatly reduced.

Optionally, the channel rate control module 403 is further configured to decrease a negotiated rate of a physical channel in the port that is greater than the channel transmission rate, so that the negotiated rate of the physical channel decreases to the channel transmission rate. In this way, negotiated rates of available physical channels in the port are the same, so that utilization of transmission performance of all the physical channels can be balanced.

Optionally, if the largest total port bandwidth in the M total port bandwidths is corresponding to two or more negotiated rates, the channel rate control module 403 may select, from the two or more negotiated rates, a lowest negotiated rate as the channel transmission rate. A low negotiated rate is selected as the channel transmission rate, so that more physical channels can be used instead of being disabled, and load of all the physical channels can be balanced.

Figure 4:
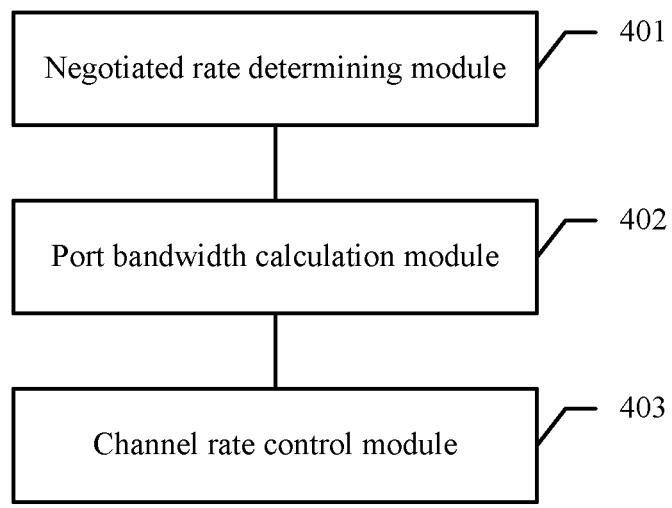
FIG. 4 is a structural diagram of an embodiment of a computer device according to this application.

For related descriptions of the computer device shown in FIG. 4, refer to the related descriptions in the method embodiment shown in FIG. 3. Details are not described herein again.

The computer device shown in FIG. 4 may be implemented by the computer device 200 shown in FIG. 2. This is not limited in this application.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method for determining a port rate, applied to a computer device, wherein the computer device comprises a port for performing data transmission with a peer end, the port comprises N physical channels, the method comprising:

obtaining, by the computer device, a negotiated rate of each of the N physical channels, to obtain M different negotiated rates, wherein a negotiated rate is a communication rate negotiated for each physical channel when a connection is established between the port and a port of the peer end, N is a positive integer greater than 1, and M is a positive integer not greater than N;

determining, by the computer device, a total port bandwidth corresponding to each of the M negotiated rates, wherein a total port bandwidth corresponding to an $i^{th}$ negotiated rate in the M negotiated rates is a total bandwidth reached by the port when the $i^{th}$ negotiated rate is set as a channel transmission rate of the port for representing an actual rate of data transmission on each physical channel in the port and wherein the total port bandwidth corresponding to the $i^{th}$ negotiated rate is a product of the $i^{th}$ negotiated rate and a quantity of physical channels whose negotiated rates are not less than the $i^{th}$ negotiated rate in the N physical channels; and setting, by the computer device, a negotiated rate corresponding to a largest total port bandwidth in total port bandwidths corresponding to the M negotiated rates as the channel transmission rate of the port.

2. The method according to claim 1, further comprising:
after setting the negotiated rate, disabling a physical channel whose negotiated rate is less than the channel transmission rate in the N physical channels.

3. The method according to claim 1, further comprising:
after setting the negotiated rate, decreasing a negotiated rate of a physical channel in the N channels that is greater than the channel transmission rate to the channel transmission rate.

4. The method according to claim 1, wherein setting the negotiated rate comprises:
determining a lowest negotiated rate in the two or more negotiated rates as the channel transmission rate of the port when the largest total port bandwidth in the total port bandwidths corresponding to the M negotiated rates is corresponding to two or more negotiated rates.

5. A computer device, comprising:
a port for performing data transmission with a peer end, wherein the port comprises N physical channels;
a processor; and
a memory storing instructions that, when executed by the processor, cause the computer device to:
obtain a negotiated rate of each of the N physical channels, to obtain M different negotiated rates, wherein a negotiated rate is a communication rate negotiated for each physical channel when a connection is established between the port and a port of the peer end, N is a positive integer greater than 1, and M is a positive integer not greater than N,
determine a total port bandwidth corresponding to each of the M negotiated rates, wherein a total port bandwidth corresponding to an $i^{th}$ negotiated rate in the M negotiated rates is a total bandwidth reached by the port when the $i^{th}$ negotiated rate is set as a channel transmission rate of the port for representing an actual rate of data transmission on each physical channel in the port and wherein the total port bandwidth corresponding to the $i^{th}$ negotiated rate is a product of the $i^{th}$ negotiated rate and a quantity of physical channels whose negotiated rates are not less than the $i^{th}$ negotiated rate in the N physical channels, and
set a negotiated rate corresponding to a largest total port bandwidth in total port bandwidths corresponding to the M negotiated rates as the channel transmission rate of the port.

6. The computer device according to claim 5, wherein the instructions, when executed by the processor, cause the computer device to:
after setting the negotiated rate, disable a physical channel whose negotiated rate is less than the channel transmission rate in the N physical channels.

7. The computer device according to claim 5, wherein the instructions, when executed by the processor, cause the computer device to:

after setting the negotiated rate, decrease a negotiated rate of a physical channel in the N channels that is greater than the channel transmission rate to the channel transmission rate.

8. The computer device according to claim 5, wherein to set the negotiated rate, the instructions, when executed by the processor, cause the computer device to:

determine a lowest negotiated rate in the two or more negotiated rates as the channel transmission rate of the port when the largest total port bandwidth in the total port bandwidths corresponding to the M negotiated rates is corresponding to two or more negotiated rates.

\* \* \* \* \*